UNITED STATES PATENT OFFICE.

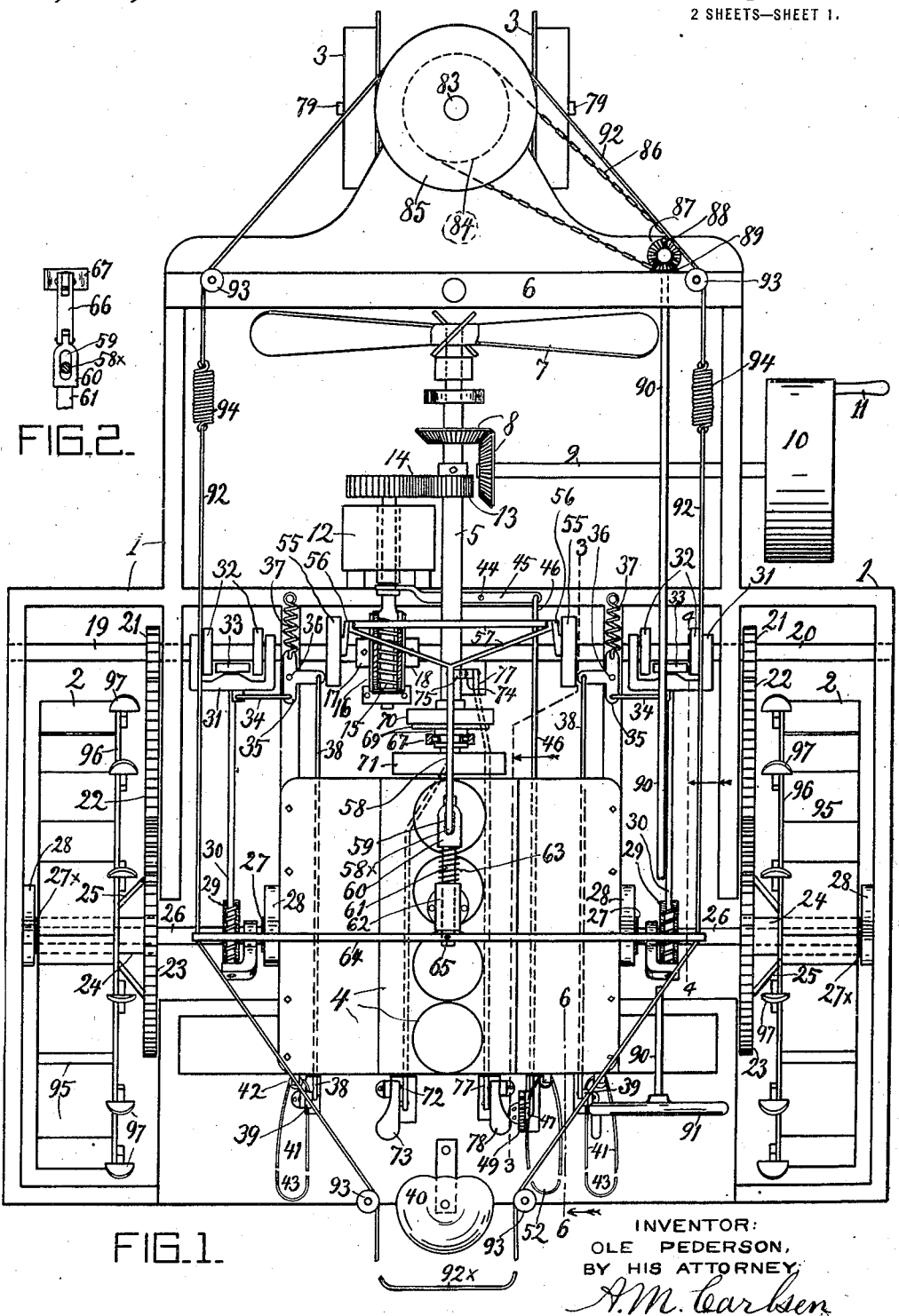

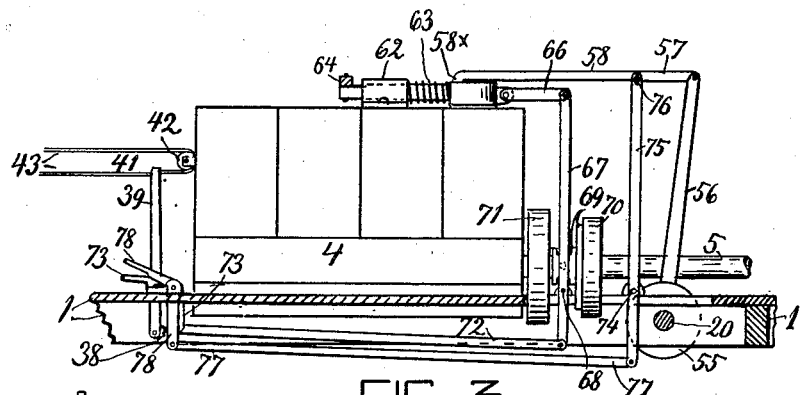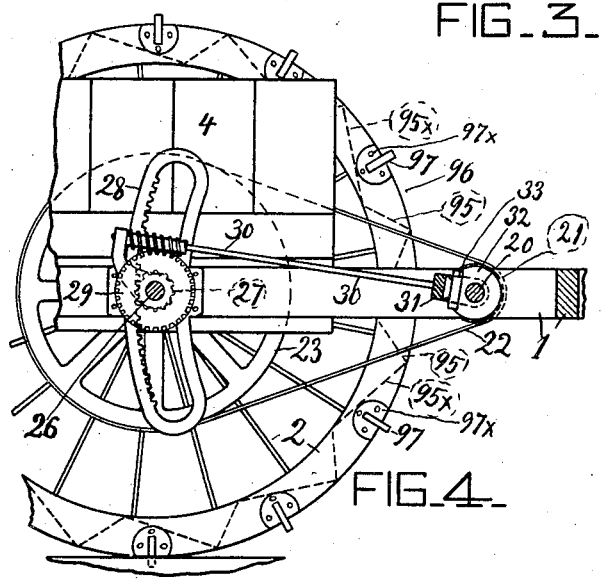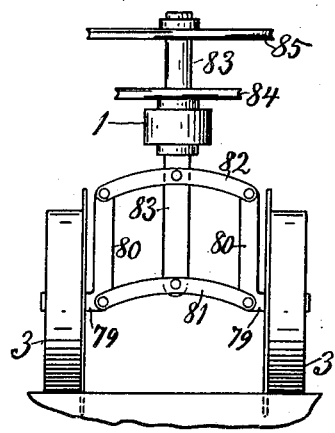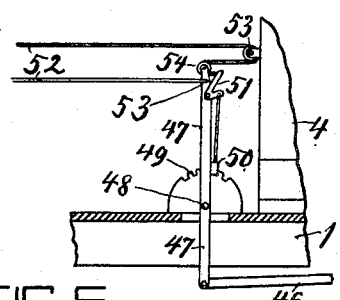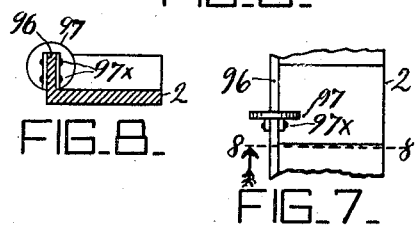

OLE PEDERSON, OF BOYCEVILLE, WISCONSIN.

TRACTOR.

1,317,312.      Specification of Letters Patent.     Patented Sept. 30, 1919.

Application filed April 26, 1918. Serial No. 231,048.

*To all whom it may concern:*

Be it known that I, OLE PEDERSON, a citizen of the United States, residing at Boyceville, in the county of Dunn and State of Wisconsin, have invented a new and useful Tractor, of which the following is a specification.

My invention relates to tractors, and the main object is to provide a tractor with novel and effective means by which the operator of such a machine may control every part of it while either riding on the tractor or walking or riding behind it. Another object is to provide a tractor with improved traction wheels. A third object is to provide a tractor with improved means for raising and lowering either side of its frame by mechanisms operable from the engine of the tractor.

These and other objects I attain by the novel construction and combination of parts illustrated in the accompanying drawings, in which:

Figure 1 is a top or plan view of a tractor embodying my invention, with the lever 67 partly broken away and with its top link 66 shown in Fig. 2, so as to avoid obstructing it in Fig. 1. Fig. 2 is a fragmentary view of said portion removed from Fig. 1. Fig. 3 is a section on the line 3—3 in Fig. 1, with the engine intact. Fig. 4 is a section on the line 4—4 in Fig. 1. Fig. 5 is a front end elevation of the tractor. Fig. 6 is a section on the line 6—6 in Fig. 8. Fig. 7 is an enlarged top view of a small portion of one of the traction wheels. Fig. 8 is a section on the line 8—8 in Fig. 7.

Referring to the drawing by reference numerals, 1 designates the main frame, 2 the traction wheels, 3 the steering wheels, 4 the engine, 5 the engine shaft, 6 the radiator, 7 the cooling fan for the radiator, all arranged about as usually in a gasolene tractor.

Geared to the engine shaft by miter gears 8 is a shaft 9, having a pulley 10 for driving other machinery by belt power when so desired while the tractor stands still. Said pulley may be provided with a handle 11, which may be used in "cranking" the engine.

Concealed in a housing 12 and operated by gears 13, 14 are the regular speed changing and reversing gears, which operate a worm-screw 15, and the latter rotates a worm-wheel 16, inside of which is a regular differential gear, having hubs, 17, 18, fixed on the left and right sections 19 and 20, respectively, of a transverse main shaft journaled on the frame and provided each with a sprocket 21. Said sprocket drives a chain 22 and thereby a large sprocket 23, which by a hub 24 and braces 25 is secured to the traction wheel.

Each traction wheel, with its sprocket 23, is rotatably mounted on a shaft 26, whose ends are fixed one in a cog pinion 27, the other in a cog pinion 27ˣ. Each pinion is arranged to roll up and down in a toothed segment 28 fixed on the main frame. But to or near each pinion 27 is secured a worm-wheel 29, which is engaged by a worm-screw 30, whose front end is journaled in a U-shaped frame 31, which is slidable on the shaft 19—20. On said shaft are also fixed, within each frame 31, a pair of friction wheels 32. Fixed on the front end of each worm shaft 30 is a friction wheel 33, which will be rotated alternately in opposite directions when in contact with one or the other of the friction wheels 32, or it will remain idle when not in contact with either of them. Said frame 31 is connected by a link 34 to a three-armed lever 35, which is fulcrumed at 36 and normally held in idle position by a spring 37. An other arm of the lever is connected by a rod 38 to an upright hand lever 39 arranged within reach of the operator when he is on the seat 40. But to make these levers operable also from a plow or other implement on which the operator often rides in rear of the tractor, each lever 39 is provided with a rope or like flexible element, 41, which has one run passed over a pulley 42 (see Fig. 3) mounted on the tractor, said rope forming a bight 43, which may reach any desired distance rearward of the tractor.

Fulcrumed at 44 to the main frame is the regular speed changing and reversing lever 45; this lever is connected by a rod 46 to a hand-lever 47 (see Fig. 6), which is fulcrumed at 48 to a notched sector 49 and carries a dog 50 arranged to engage the notches of the sector. Said dog is controlled by the usual finger lever 51; but in order to control this lever 47 by a cord 52, I attach one end of the cord to the lever 47 and the other end I pass over a guide pulley 53 mounted on the tractor, and thence rearwardly over a guide pulley 54 on the lever and then attach it to the finger lever 51.

Arranged upon each of the shaft sections 19, 20 is a brake 55, which may be of any of the ordinary types and therefore need not be here further described. In the present instance the controlling lever 56 of each brake is connected to a yoke 57, which has a rod 58 extending rearwardly and provided with a downward hook or pin 58× (see Figs. 2 and 3), which is placed in a slot 59 of a member 60. This member has a rearward extension 61 slidable in a bracket 62 fixed upon the engine. 63 is a spring tending at all times to hold the member in a forwardly pushed position. The action of said spring is limited by a transverse bar 64, which is pivoted at 65 to the member and normally held by the spring against the rear end of the bracket. The full service of this bar will presently be fully described.

Connected to the front end of member 60, by a link 66, is a vertically disposed beam lever 67, which is fulcrumed at 68 to the frame (see Fig. 3) and engages the slidable member 69 of the usual engine clutch 70, which is located forward of the fly-wheel 71. The lower end of this lever 67 is connected by a rod 72 to a pedal 73 at the rear of the main frame.

Fulcrumed at 74 is another beam-lever, 75, which has its upper end provided with a slotted hole 76, and at said hole it is pivoted to the rod 58. The lower end of this lever is connected by a rod 77 to a pedal 78 at the rear end of the tractor frame.

The steering wheels 3 at the front are journaled on skeins 79 having vertical arms 80 pivoted to the ends of two horizontal bars 81, 82, the middle of which are pivoted to a vertical steering shaft 83. The latter shaft is journaled in the front end of frame 1 and on it are fixed two wheels, 84 and 85. The wheel 84 is engaged by a chain 86, which is operated by a small chain wheel 87, at the upper side of which is fixed a bevel gear 88. The latter is rotated by a bevel pinion 89 fixed on a shaft 90, which extends through the radiator 6 and has its rear end provided with a hand wheel 91, which enables the operator to steer the machine while he is riding on it.

Suitably secured to the wheel 85 are the two front ends of a rope or other flexible member 92, which is guided by pulleys 93 and has its rear portion formed into a bight 92× adapted to be operated by a person riding or walking rearward of the tractor. The rearwardly extended strands of said rope are secured one to each end of the bar 64, and some place forward of said bar is inserted in each strand a coil spring 94.

Each traction wheel is preferably constructed with a main face having hollow cleats 95, which are in the form of ratchet teeth arranged to support and pull with their larger faces, 95× (see Fig. 4). This arrangement gives a good bearing on the ground and prevents packing or clogging between the cleats. The inner edge of the wheel face is provided with a peripheral rim 96, to which are secured calks 97, which may be of the form shown in Fig. 1, or preferably the disk-shaped form shown in Figs. 7 and 8. They should extend in radial direction of the wheel but little beyond the rim 96, to which they are secured by either rivets or bolts, 97×, and extend at both sides of the rim at points between the cleats.

In the operation of the machine, if the operator rides on the seat 40 he steers with the hand wheel 91, uses clutch pedal 73, brake pedal 78 and the starting, stopping, reversing and speed changing lever 47 for their respective functions; he also uses the levers 39 for raising by the friction wheels either side of the frame which is farthest down the incline of the ground, or whose traction wheel perhaps is traveling in a furrow already plowed.

But if the operator rides on an implement drawn behind the tractor, he operates the levers 39 by the ropes 43, the lever 47 by the rope 52; and by pulling at the bight or rope 92× he steers the front wheels by the wheel 85, the bar 64 simply swinging at its pivot 65; but by pulling at both arms or strands of the rope the springs 94 will yield and allow the entire bar 64 to move rearwardly; this causes a partial compression of the spring 63 and causes the link 66 to act on the lever 67 and release the clutch 69—70, thus uncoupling the engine from the shaft 5. If it is not only desired to thus stop the tractor but also to apply the brakes 55—56, the operator simply pulls further at the ropes until the front terminal of the slot 59 engages the portion 58× of the rod 58, and by pulling it rearwardly causes the brake arms or levers 56 to swing and apply the brakes. During the forward movement of the tractor, if the ground is inclined to the right or left, one of the front wheels will automatically rise and the other will sink without changing their parallel and vertical position but may simply be drawn more or less toward each other.

Having thus described my invention, what I claim is:

1. In a tractor having a frame with traction wheels and an engine clutch-connected with the traction wheels, a wheel-supported vertical steering shaft, a wheel fixed at the upper end of said shaft, flexible members secured to said wheel for rotating it in either direction and extending rearwardly of the tractor frame and arranged to be operated by hand, pulleys on said frame for guiding said flexible members in spaced relation and in converged relation near the rear of the frame; a transverse bar having its ends secured to said flexible members, a bracket mounted on the tractor, a member slidable in the bracket and having its rear end pivoted to the middle of the transverse bar, a spring acting on the slidable member to hold it forward with the bar resting against the bracket, and operative connection between the slidable member and the clutch; brakes for controlling the speed of the motor, and operative connection between said brakes and the slidable member; said connection having a joint with sufficient lost motion to allow the slidable member to open the clutch before it applies the brakes, and springs inserted in the flexible members forward of the transverse bar.

2. The structure specified in claim 1, and a pedal mounted upon the rear end of the tractor frame, and operative connection between said pedal and the spring-pressed slidable member in the bracket.

3. The structure specified in claim 1, said operative connection between the clutch and the slidable member comprising a beam-lever fulcrumed on the frame and having one end link-connected to the slidable member and the other end connected by a rod to a pedal mounted on the rear end of the frame.

4. The structure specified in claim 2, said operative connection between the clutch and the slidable member comprising a beam-lever fulcrumed on the frame and having one end link-connected to the slidable member and the other end connected by a rod to a pedal mounted on the rear end of the frame.

In testimony whereof I affix my signature.

OLE PEDERSON.